(12) United States Patent
Hoang et al.

(10) Patent No.: US 6,971,682 B2
(45) Date of Patent: Dec. 6, 2005

(54) COUPLING ASSEMBLY

(75) Inventors: Steve Hoang, Orange, CA (US); Jorge L. Valladares, III, West Hills, CA (US)

(73) Assignee: Adel Wiggins Group, Transdigm, Inc., Los Angeles, CA (US)

( * ) Notice: Subject to any disclaimer, the term of this patent is extended or adjusted under 35 U.S.C. 154(b) by 0 days.

(21) Appl. No.: 10/413,583

(22) Filed: Apr. 15, 2003

(65) Prior Publication Data

US 2004/0207197 A1   Oct. 21, 2004

(51) Int. Cl.7 .............................................. F16L 19/00
(52) U.S. Cl. ................ 285/93; 285/123.3; 285/123.12; 285/365; 285/123.15
(58) Field of Search ............................... 285/93, 123.1, 285/123.3, 123.4, 123.6, 123.12, 365, 123.15, 285/123.16; 29/890.14

(56) References Cited

U.S. PATENT DOCUMENTS

| | | | |
|---|---|---|---|
| 3,046,938 A * | 7/1962 | Perkins ........................ 285/365 |
| 3,499,667 A * | 3/1970 | Pfeuffer ....................... 285/365 |
| 3,669,474 A * | 6/1972 | Bode ........................... 285/365 |
| 4,249,786 A | 2/1981 | Mahoff ......................... 285/233 |
| 4,666,189 A * | 5/1987 | Taylor et al. ........... 285/123.16 |
| 4,881,760 A * | 11/1989 | Runkles et al. ................ 285/93 |
| 4,900,070 A * | 2/1990 | Runkles et al. .............. 285/233 |
| 4,929,000 A * | 5/1990 | Annestedt, Sr. ......... 285/123.16 |
| 5,011,193 A * | 4/1991 | Porte ...................... 285/123.15 |
| 5,188,400 A * | 2/1993 | Riley et al. .................. 285/233 |
| 5,449,203 A * | 9/1995 | Sharp ..................... 285/123.15 |
| 5,620,210 A * | 4/1997 | Eyster et al. .................. 285/93 |
| 5,931,184 A | 8/1999 | Armenia et al. ............. 137/312 |
| 6,682,102 B1 * | 1/2004 | Betz ...................... 285/123.15 |

* cited by examiner

*Primary Examiner*—David Bochna
(74) *Attorney, Agent, or Firm*—Baker & Hostetler LLP

(57) ABSTRACT

A coupling assembly for fuel transfer includes a first inner conduit attached to a first ferrule adapter and a second inner conduit attached to a second ferrule adapter. An inner conduit coupling engages the first inner conduit sealing mechanism and the second inner conduit sealing mechanism, thereby connecting the first inner conduit to the second inner conduit. A first outer conduit surrounds the first inner conduit. The first outer conduit is attached to the first ferrule adapter and the second outer conduit is attached to the second ferrule adapter. An outer conduit coupling engages the first and second outer conduit sealing mechanism thereby connecting the first outer conduit to the second outer conduit.

16 Claims, 5 Drawing Sheets

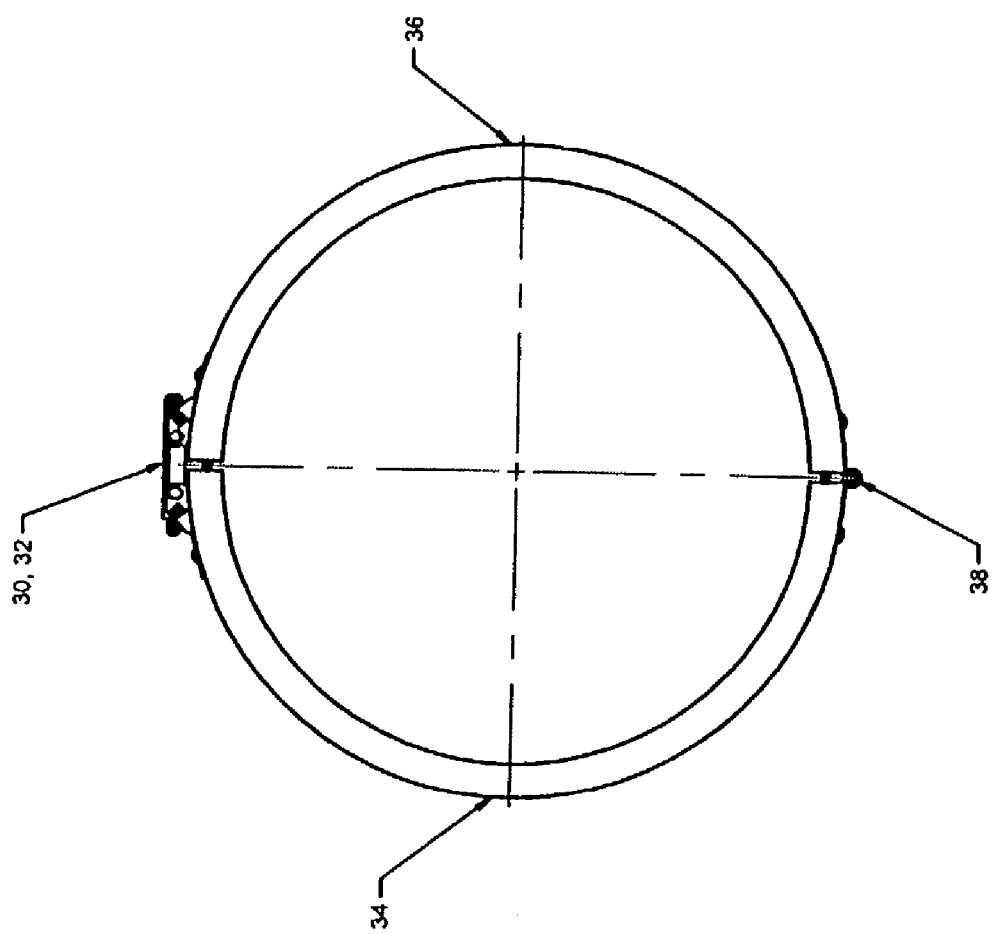

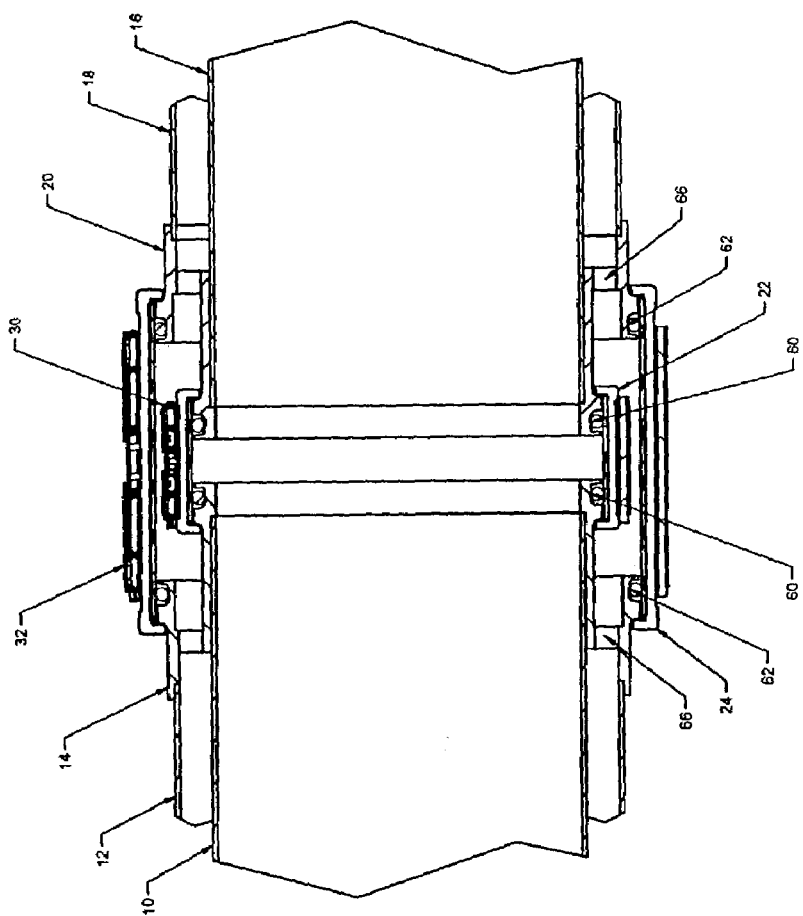
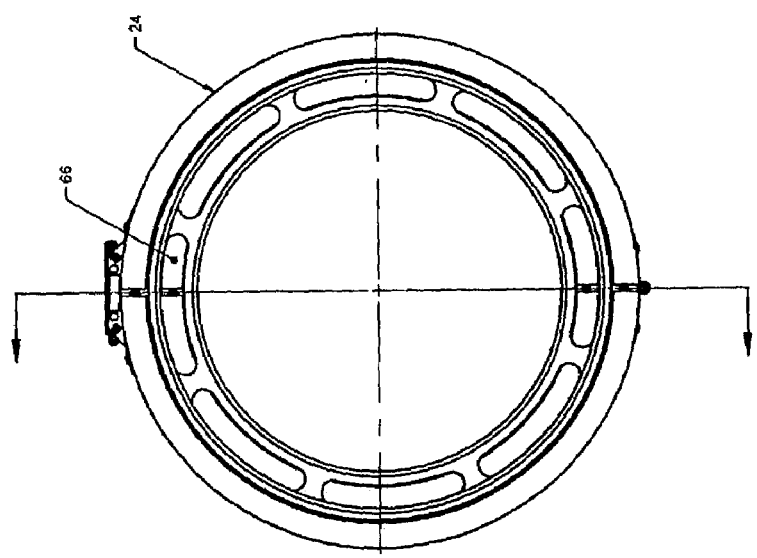
FIG. 7

COUPLING ASSEMBLY

FIELD OF THE INVENTION

The present invention relates generally to coupling assemblies. More particularly, the present invention relates to coupling assemblies having a coupling that engages two conduits for a secure flow through the conduits.

BACKGROUND OF THE INVENTION

Safety in transporting or moving fuel through a conduit is very important because of the volatile and explosive nature of fuel. Many have designed couplings and other devices to join fuel transfer conduits together. In the airplane industry it is critical to the preservation of human life to ensure that fuel does not leak from the fuel transfer conduits.

One area that is susceptible to leakage is the joint between two conduits. In many cases more than one fuel transfer conduit is used to move fuel from a storage tank to an engine. In airplanes several fuel transfer conduits may be used transport fuel from the airplane's fuel tanks to the engine of the plane.

Since several fuel transfer conduits are needed to move fuel from the storage tank to the engine, couplings are needed to connect ends of the fuel transfer conduits to one another. It is critical that these couplings make a secure seal so that fuel does not leak. If there is a leakage, catastrophic failures may occur.

Accordingly, it is desirable to provide a coupling assembly that will securely seal ends of fuel transfer conduits to one another. It is also desirable to provide safeguards to ensure that there will be no leakage of fuel from the fuel transfer conduits.

SUMMARY OF THE INVENTION

The foregoing needs are met, to a great extent, by the present invention, wherein in one aspect the invention in some embodiments provides a coupling that securely seals ends of two conduits together and also provides an indicator that ensures that the couplings are securely engaging the ends of the conduits. The invention in some embodiments also provides inner and outer coupling assemblies so that if the inner coupling assembly leaks fuel the outer coupling assembly can contain the fuel avoiding a dangerous catastrophic situation.

In accordance with one embodiment of the invention, a coupling assembly for fuel transfer includes a first inner conduit attached to a first ferrule adapter. The first ferrule adapter includes a first inner conduit sealing mechanism. A second inner conduit is attached to a second ferrule adapter. The second ferrule adapter includes a second inner conduit sealing mechanism. An inner conduit coupling engages the first inner conduit sealing mechanism and the second inner conduit sealing mechanism, thereby connecting the first inner conduit to the second inner conduit. The inner conduit coupling includes a first inner conduit coupling half and a second inner conduit coupling half. The first inner conduit coupling half is connected to the second inner conduit coupling half at a first end to allow for opening and closing of the inner conduit coupling. A latch secures the first inner conduit coupling half to the second inner conduit coupling half at a second end when the inner conduit coupling is in a closed position. An indication device closes into a locked position only when the latch secures the first inner conduit coupling half to the second inner conduit coupling half.

The first and second inner conduit sealing mechanisms each include a groove in an outer periphery of each of the first and second ferrule adapters so that an o-ring can be positioned in the groove and engaged by the inner conduit coupling.

The assembly also includes a first outer conduit surrounding the first inner conduit. The first outer conduit is attached to a first ferrule adapter. The first ferrule adapter includes a first outer conduit sealing mechanism. A second outer conduit surrounds the second inner conduit. The second outer conduit is attached to a second ferrule adapter. The second ferrule adapter includes a second outer conduit sealing mechanism.

An outer conduit coupling engages the first outer conduit sealing mechanism and the second outer conduit sealing mechanism, thereby connecting the first outer conduit to the second outer conduit. The outer conduit coupling includes a first outer conduit coupling half and a second outer conduit coupling half. The first outer conduit coupling half is connected to the second outer conduit coupling half at a first end to allow for opening and closing of said outer conduit coupling. A latch secures the first outer conduit coupling half to the second outer conduit coupling half at a second end when the outer conduit coupling is in a closed position. An indication device closes into a locked position only when the latch secures the first outer conduit coupling half to the second outer conduit coupling half.

The first and second outer conduit sealing mechanisms each include a groove in an outer periphery of each of the first and second ferrule adapters so that an o-ring can be positioned in the groove and engaged by the outer conduit coupling.

In another embodiment of the invention a coupling assembly for fuel transfer includes a first inner conduit attached to a first ferrule adapter. The first ferrule adapter includes a first inner conduit sealing mechanism, and a second inner conduit attached to a second ferrule adapter. The second ferrule adapter includes a second inner conduit sealing mechanism. An inner conduit coupling engages the first inner conduit sealing mechanism and the second inner conduit sealing mechanism, thereby connecting the first inner conduit to the second inner conduit. A first outer conduit surrounds the first inner conduit. The first outer conduit is attached to the previously mentioned first ferrule adapter. The first ferrule adapter includes a first outer conduit sealing mechanism. The second outer conduit is attached to a second ferrule adapter. The second ferrule adapter includes a second outer conduit sealing mechanism.

An outer conduit coupling engages the first outer conduit sealing mechanism and the second outer conduit sealing mechanism, thereby connecting the first outer conduit to the second outer conduit.

The first and second inner conduit sealing mechanisms each include a groove in an outer periphery of each of the first and second ferrule adapters so that an o-ring can be positioned in the groove and engaged by the inner conduit coupling.

The first and second outer conduit sealing mechanisms each include a groove in an outer periphery of each of the first and second ferrule adapters so that an o-ring can be positioned in the groove and engaged by the outer conduit coupling.

An inner conduit coupling indicating device can be closed only when the inner conduit coupling engages the first inner conduit sealing mechanism and the second inner conduit sealing mechanism.

An outer conduit coupling indicating device can be closed only when said outer conduit coupling engages the first outer conduit sealing mechanism and the second outer conduit sealing mechanism.

In an alternate embodiment of the invention a coupling assembly for fuel transfer includes a first conduit coupling half and a second conduit coupling half. The first conduit coupling half is connected to the second conduit coupling half at a first end to allow for opening and closing of the coupling assembly. A latch secures the first conduit coupling half to the second conduit coupling half at a second end when the coupling assembly is in a closed position. An indication device closes into a locked position only when the latch secures the first conduit coupling half to the second conduit coupling half.

The latch includes a first latch pin located on the first conduit coupling half, and a first and second latch segment pivotally attached to the first latch pin. A second latch pin is located on the second coupling half so that the first and second latch segments can engage the second latch pin. A third latch segment is pivotally attached to the second latch pin so that it can engage the first latch pin.

A first pivot supports the first latch pin on the first conduit coupling half. A second pivot supports the second latch pin on said second conduit coupling half.

A first spring clip is attached to the first conduit coupling half and applies a downward force on the first and second latches.

The indicating device is in communication with the second spring clip, which applies an upward force on the indicating device forcing the indicating device into an open state.

The second spring clip is attached to the second conduit coupling half and applies a downward force on the third latch.

The indicating device is attached to the second latch pin and can only engage the first pivot when the first and second latch segments engage the second latch pin and the third latch segment engages the first latch pin. The indicating device includes two detents to secure the indicating device.

In another embodiment of the invention a method for fuel transfer includes the steps of securing a first inner conduit to a second inner conduit with an inner coupling, allowing fuel flow through the first inner conduit to the second inner conduit, and allowing fuel flow through an outer conduit when there is a fuel flow leak in said first or second inner conduit, or in the inner coupling.

The method also includes the steps of securing a first portion of the outer conduit to a second portion of the outer conduit with an outer coupling.

The step of securing the first inner conduit includes the step of latching a first half of the inner coupling to a second half of the inner coupling, thereby securing the first inner conduit between the first half of the inner coupling and the second half of the inner coupling.

The invention also includes the step of indicating when the first inner conduit has been secured between the first half of the inner coupling and the second half of the inner coupling.

In an alternate embodiment of the invention, a system for fuel transfer includes a means for securing a first inner conduit to a second inner conduit with an inner coupling, means for allowing fuel flow through the first inner conduit to the second inner conduit, and means for allowing fuel flow through an outer conduit when there is a fuel flow leak in the first or second inner conduit.

The system also includes means for securing a first portion of the outer conduit to a second portion of the outer conduit with an outer coupling.

The means for securing the first inner conduit includes means for latching a first half of the inner coupling to a second half of the inner coupling, thereby securing the first inner conduit between the first half of the inner coupling and the second half of the inner coupling.

The system further includes means for indicating when the first inner conduit has been secured between the first half of the inner coupling and the second half of the inner coupling.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a profile view of a coupling.
FIG. 7 is a cross-sectional view of a coupling assembly having an inner conduit and an outer conduit.

DETAILED DESCRIPTION

Figure 1:
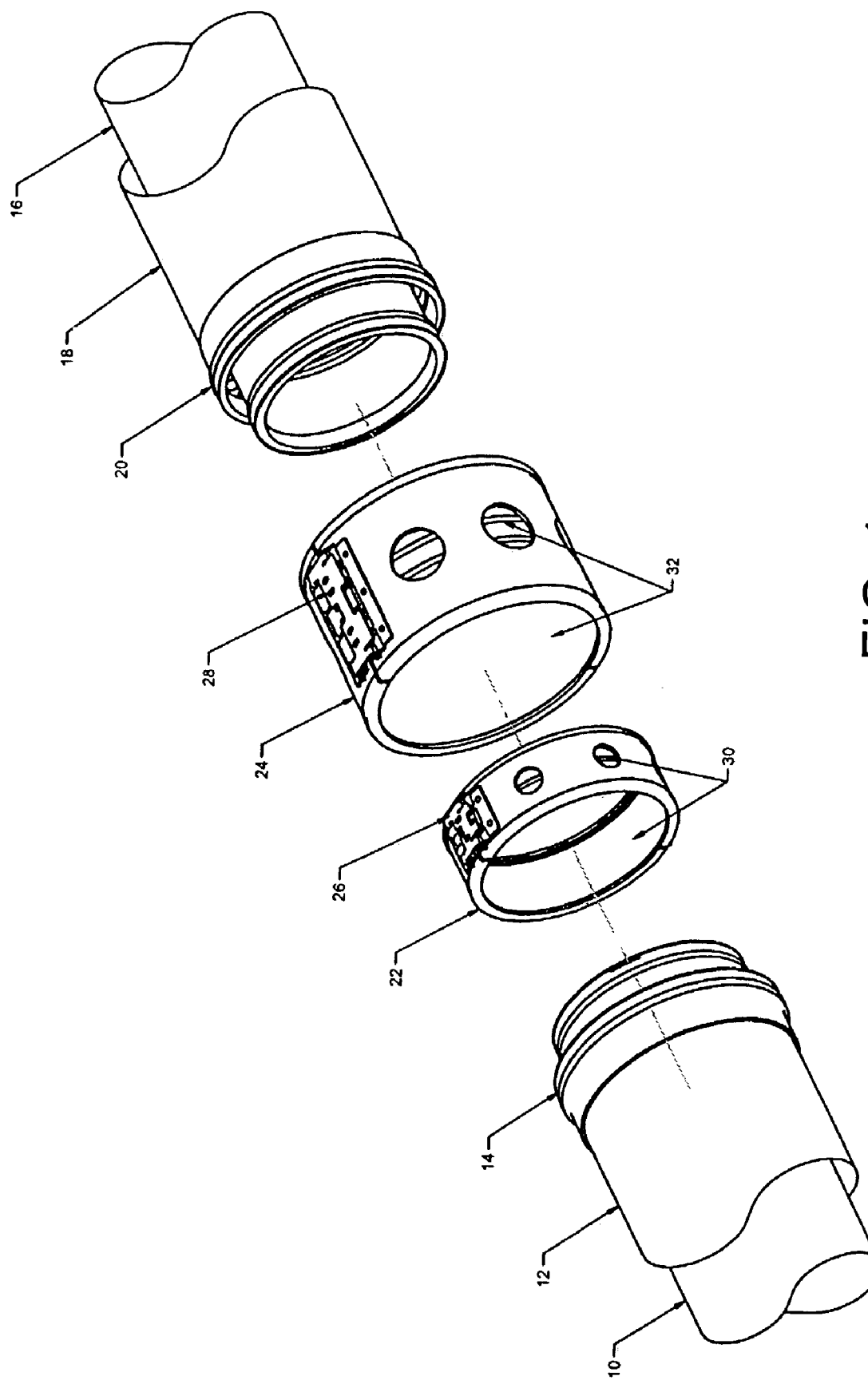
FIG. 1 is an exploded view of a coupling assembly.

The invention will now be described with reference to the drawing figures, in which like reference numerals refer to like parts throughout. An embodiment in accordance with the present invention provides a coupling that securely seals ends of two conduits together and also provides an indicator that ensures that the couplings are securely engaging the ends of the conduits. The invention in some embodiments also provides inner and outer coupling assemblies so that if the inner coupling assembly leaks fuel the outer coupling assembly can contain the fuel avoiding a dangerous catastrophic situation.

An embodiment of the present inventive apparatus is illustrated in FIG. 1. Depicted in FIG. 1 is a first inner conduit 10 and a first outer conduit 12. A first ferrule adapter 14 is connected to the ends of both the first inner conduit 10 and the first outer conduit 12.

A second inner conduit 16 is located opposite of first inner conduit 10. A second outer conduit 18 is located opposite of first outer conduit 12. A second ferrule adapter 20 is connected to the ends of both the second inner conduit 16 and the second outer conduit 18, and oriented so that it faces the first ferrule adapter 14.

An inner coupling 22 secures the inner lips of both first ferrule adapter 14 and second ferrule adapter 20 together connecting first inner conduit 10 to second inner conduit 16. An outer coupling 24 secures the outer lips of both first ferrule adapter 16 and second ferrule adapter 20 together connecting first outer conduit 12 to second outer conduit 18. The inner coupling 22 has a latch system 26 used to connect the inner conduits together and outer coupling 24 has a latch system 28 used to connect the outer conduits together. Inner and outer couplings 22, 24 also include shells 30 and 32, respectively, located on the inner surface of the inner and outer couplings 22, 24. Shells 30, 32 can have grooves for handling purposes.

FIG. 2 illustrates that inner and outer couplings 22, 24 are made up of two (2) semi-circular coupling halves 34,36 that are hinged together at one end 38 and joined together at the other end with latch systems 30,32 in order to secure the halves as a single continuous annular unit.

In one embodiment of the invention, fuel flows through first inner conduit 10 to second inner conduit 16. Inner coupling 22 secures lip of the first ferrule adapter 14 to inner lip of the second ferrule adapter 20 allowing fuel to flow from first inner conduit 10 to second inner conduit 16 without leaking.

In the event that fuel does leak from the first and second inner conduits 10, 16, first and second outer conduits 12, 18 prevent any further leakage since they surround first and second inner conduits 10, 16. Outer coupling 24 secures the outer lip of first ferrule adapter 14 and the outer lip of second ferrule adapter 20 together preventing fuel from leaking when flowing from first outer conduit 12 to second outer conduit 18.

Figure 3:
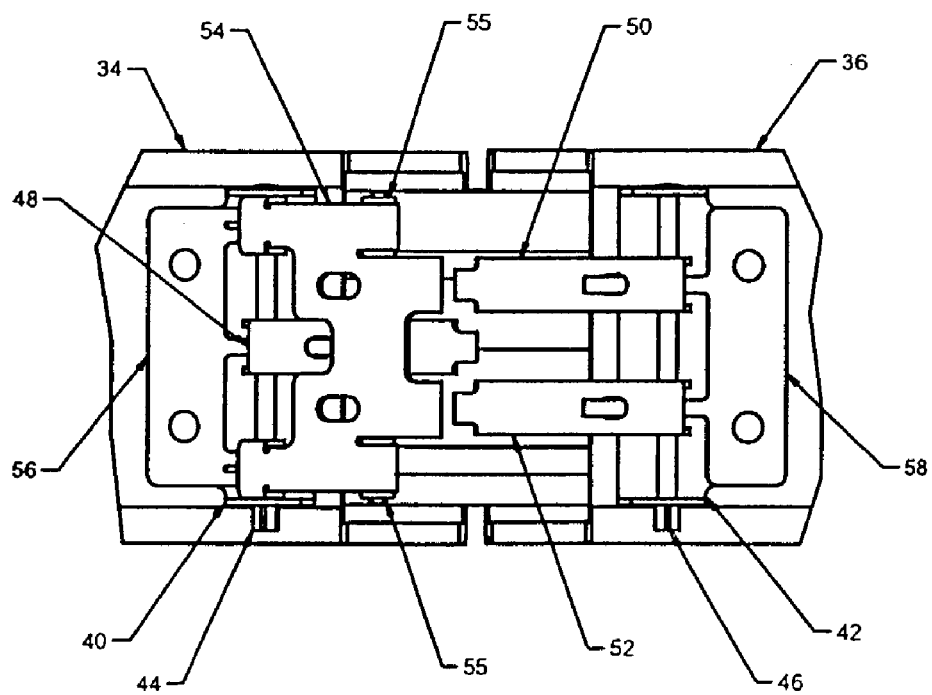
FIG. 3 is a top view of a latch system in an open position for a coupling assembly.

FIG. 3 is an illustration of latch systems 30,32 in an open position. A pivot 40 is located on coupling half 34 and pivot 42 is located on coupling half 36. Pivot 40 supports a first latch pin 44 and pivot 42 supports latch pin 46.

A first latch segment 48 is pivotally attached to latch pin 44. Second latch segment 50 and third latch segment 52 are pivotally attached to latch pin 46. An indication device 54 is pivotally attached to latch pin 44 over first latch segment 48. Indication device 54 has detents 55, which can be spring loaded to assist indication device 54 to engage into a closed position.

A first spring clip 56 is attached to coupling half 34. Spring clip 56 provides a downward force on latch segment 48 toward coupling half 34 and provides an upward force on indication device 54 away from coupling half 34.

A second spring clip 58 is attached to coupling half 36. Spring clip 58 provides a downward force on latch segments 50,52 toward coupling half 36.

Thus when latch systems 30,32 are in an opened position the latch segments 48,50,52 are forced in a close downward position by first and second spring clips 56,58 and the indication device 54 is forced into an upward open position by first spring clip 56.

Figure 4:
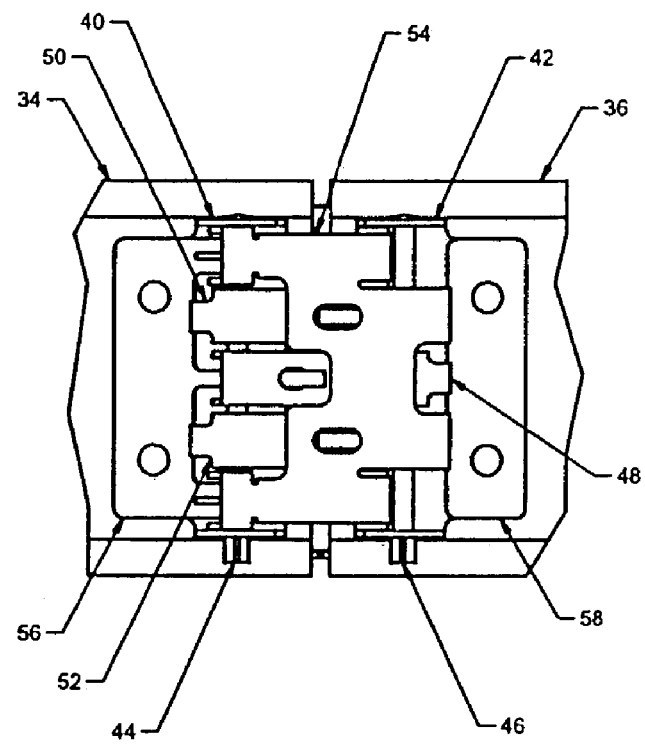
FIG. 4 is a top view of a latch system in a closed position for a coupling assembly.

FIG. 4 illustrates latch systems 30,32 in a closed position. In this embodiment of the invention each of the coupling halves 34,36 are pushed towards each other into a closed position. Latch segments 50,52 are pushed down into a closed position to engage latch pin 44. Latch segment 48 is pushed down into a closed position to engage latch pin 46. Indication device 54 can be pushed down into a closed position to engage latch pin 46. If any of the latches 48,50,52 are not fully in the closed position to engage the respective latch pins 44,46, indication device 54 will not be able to be positioned into a closed position. Thus, an inspector will be able to tell if the latches 48,50,52 are properly secured by inspecting the state of indication device 54.

Figure 5:
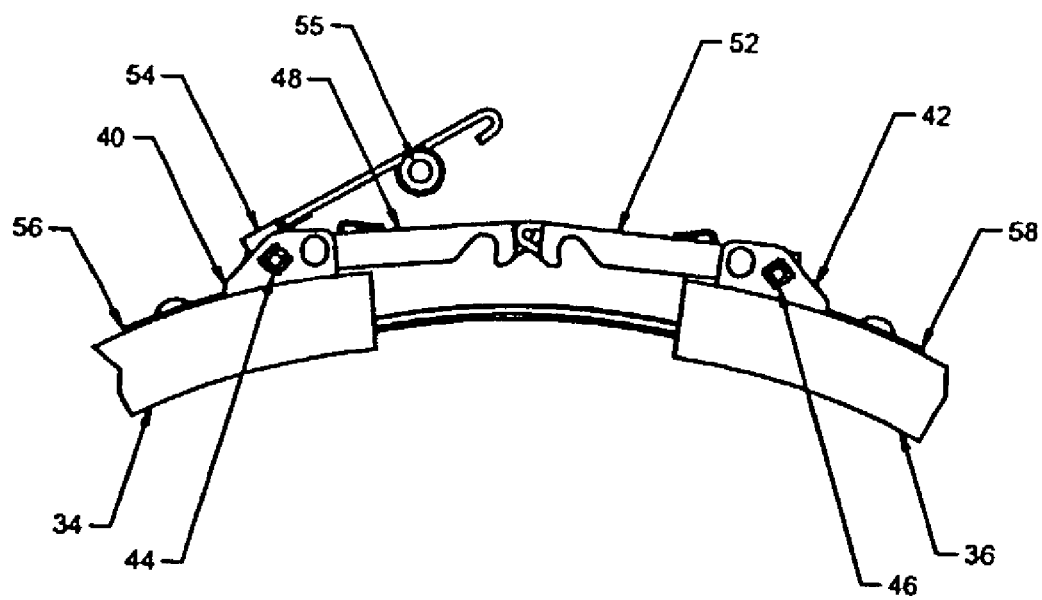
FIG. 5 is a side view of a latch system in a open position for a coupling assembly.

FIG. 5 is a profile view of latch systems 30,32 in an opened state. As previously discussed, latch segment 48 is pushed into a downward closed position by first spring clip 56 and indication device 54 is forced into an upward open position by first spring clip 56. Indication device 54 has detents 55, which can be spring loaded with a ball bearing and positioned to fit into recess 60 on pivot 42 when in a closed position. Latch segments 50,52 are pushed into a downward closed position by second spring clip 58.

Figure 6:
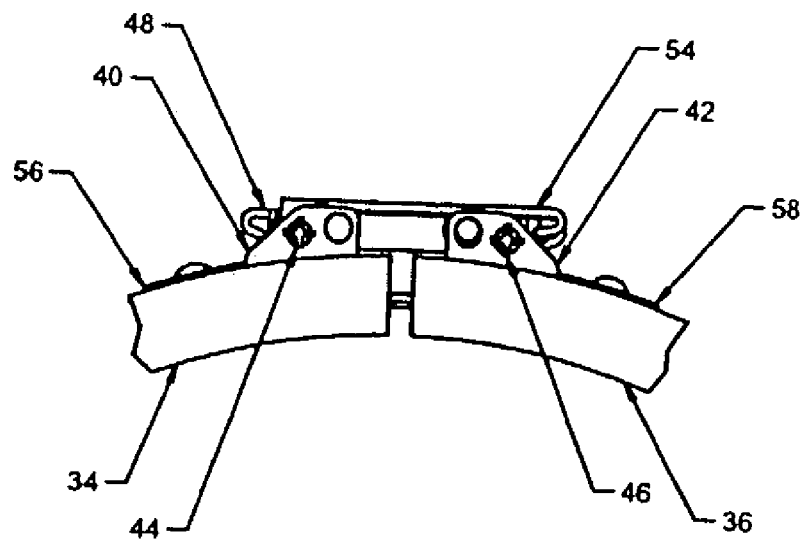
FIG. 6 is a side view of a latch system in a closed position for a coupling assembly.

FIG. 6 illustrates latch systems 30,32 in a closed position. If the latch segments 48,50,52 properly engage latch pins 44,46, indication device 54 will properly close. In another embodiment of the invention, indication device 54 is properly closed when detents 55 engage recesses 60. It is noted that first and second spring clips 36, 38 can, in one embodiment of the invention, provide sufficient downward engagement force on the latch segments 48,50,52 to engage latch pins 44,46.

FIG. 7 is a cross sectional view of a coupling assembly having inner conduits 10, 16 and outer conduits 12, 18. Inner conduit 10 and outer conduit 12 terminate with ferrule adapter 14 while inner conduit 16 and outer conduit 18 terminate with ferrule adapter 20. Ferrule adapters 14, 20 each have an inner lip 60 and an outer lip 62. The inner lip 60 contains a groove 66, and the outer lip 62 contains a groove 68. An o-ring or any other type of seal can be placed in the inner lip groove 66 to prevent leakage from the inner conduits 10, 16 when latch system 30 engages inner coupling 22 to ferrule adapter inner lips 66. However, if a leak does occur outer conduits 12, 18 are provided to prevent further leakage. An o-ring or any other type of seal can be placed in outer lip groove 68 to prevent leakage from the outer conduits 12, 18 when latch system 32 engages outer coupling 24 to ferrule adapter outer lips 68.

Thus, the invention can be a shrouded coupling assembly which employs two (2) flexible, visual indicating, clamshell couplings to connect adjoining shrouded conduits terminating with ferrule adapters within an aircraft environment. A typical clamshell coupling includes two (2) semicircular coupling halves that are hinged together at one end and joined together at the other end with latches in order to secure the halves as a single continuous annular unit. In addition, the typical clamshell also includes a cylindrical body and two (2) ferrules which include grooves that capture the o-rings. Both the body and the ferrule ends are retained within the latched coupling halves and provide sealing surfaces for the o-rings. Aircraft systems which employ clamshell couplings for joining interconnecting lines require the couplings to be safe and reliable. While the typical clamshell is relatively safe and reliable, the design will not protect against certain single point failures (i.e. o-ring damage, sealing surface degradation, etc). A second area of concern for some systems is that the typical clamshell coupling does not have visual indicating device as a redundant, fail-safe mechanism to ensure the coupling is properly latched. These two issues are overcome with the present invention.

In addition to providing the features of the typical clamshell coupling, the present invention also includes an indication device which acts as a visual indicator for the installer. The indication device is spring-loaded in the opened condition and can only be closed when the coupling halves are properly latched. The indication device includes two spring-loaded detents which allow the indicator to engage into its closed position. As a result of the design, the indicator allows for quick visual inspection of whether the coupling is properly latched. The shroud coupling assembly also addresses the single point failure issue by employing an inner coupling in combination with an outer coupling. The inner coupling connects the main fluid transfer lines while the outer coupling connects the redundant transfer line. In the case where the inner coupling/inner line fails, the outer coupling/outer line will provide proper sealing to maintain fluid transfer capabilities. According to the present invention, the inner and outer fluid lines terminate with a single ferrule adapter. The design of the ferrule adapter integrates multiple fluid transfer paths to allow fluid migration to the outer line only in the case of a failure to the internal components.

Although an example of the coupling assembly is described in an aircraft environment, it will be appreciated that other environments can be used. Also, although the coupling assembly can be useful in other industries where similar functionality may be needed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A coupling assembly for fuel transfer comprising:
    a first inner conduit attached to a first ferrule adapter, said first ferrule adapter comprising a first inner conduit sealing mechanism;
    a second inner conduit attached to a second ferrule adapter, said second ferrule adapter comprising a second inner conduit sealing mechanism;
    an inner conduit coupling that engages said first inner conduit sealing mechanism and said second inner conduit sealing mechanism, thereby connecting said first inner conduit to said second inner conduit, said inner conduit coupling comprising:
        a first inner conduit coupling half and a second inner conduit coupling half, said first inner conduit coupling half connected to said second inner conduit coupling half at a first end to allow for opening and closing of said inner conduit coupling;
        a latch system that secures said first inner conduit coupling half to said second inner conduit coupling half at a second end when the said inner conduit coupling is in a closed position; and
        an indication device that closes into a locked position only when said latches secure said first inner conduit coupling half to said second inner conduit coupling half;
    a first outer conduit surrounding said first inner conduit, said first outer conduit attached to said first ferrule adapter, said first ferrule adapter comprising a first outer conduit sealing mechanism;
    a second outer conduit surrounding said second inner conduit, said second outer conduit attached to said second ferrule adapter, said second ferrule adapter comprising a second outer conduit sealing mechanism;
    an outer conduit coupling that engages said first outer conduit sealing mechanism and said second outer conduit sealing mechanism, thereby connecting said first outer conduit to said second outer conduit, said outer conduit coupling comprising:
        a first outer conduit coupling half and a second outer conduit coupling half, said first outer conduit coupling half connected to said second outer conduit coupling half at a first end to allow for opening and closing of said outer conduit coupling;
        a system of latches that secure said first outer conduit coupling half to said second outer conduit coupling half at a second end when the said outer conduit coupling is in a closed position; and
        an indication device that closes into a locked position only when said latches secure said first outer conduit coupling half to said second outer conduit coupling half.

2. The assembly as recited in claim 1 wherein said first and second inner conduit sealing mechanisms each comprise a groove in an outer periphery of each of said first and second ferrule adapters so that an o-ring can be positioned in said groove and engaged by said inner conduit coupling.

3. The assembly as recited in claim 1 wherein said first and second outer conduit sealing mechanisms each comprise a groove in an outer periphery of each of said first and second ferrule adapters so that an o-ring can be positioned in said groove and engaged by said outer conduit coupling.

4. A coupling assembly for fuel transfer comprising:
    a first inner conduit attached to a first ferrule adapter, said first inner conduit ferrule adapter comprising a first inner conduit sealing mechanism;
    a second inner conduit attached to a second ferrule adapter, said second inner conduit ferrule adapter comprising a second inner conduit sealing mechanism;
    an inner conduit coupling that engages said first inner conduit sealing mechanism and said second inner conduit sealing mechanism, thereby connecting said first inner conduit to said second inner conduit;
    a first outer conduit surrounding said first inner conduit, said first outer conduit attached to said first ferrule adapter, said first ferrule adapter comprising a first outer conduit sealing mechanism;
    a second outer conduit surrounding said second inner conduit, said second outer conduit attached to said second ferrule adapter, said second ferrule adapter comprising a second outer conduit sealing mechanism;
    an outer conduit coupling that engages said first outer conduit sealing mechanism and said second outer conduit sealing mechanism, thereby connecting said first outer conduit to said second outer conduit.

5. The coupling assembly as recited in claim 4 wherein said first and second inner conduit sealing mechanisms each comprise a groove in an outer periphery of each of said first and second ferrule adapters so that an o-ring can be positioned in said groove and engaged by said inner conduit coupling.

6. The coupling assembly as recited in claim 4 wherein said first and second outer conduit sealing mechanisms each comprise a groove in an outer periphery of each of said first and second ferrule adapters so that an o-ring can be positioned in said groove and engaged by said outer conduit coupling.

7. The coupling assembly as recited in claim 4 further comprising an inner conduit coupling indicating device that can be closed only when said inner conduit coupling engages said first inner conduit sealing mechanism and said second inner conduit sealing mechanism.

8. The coupling assembly as recited in claim 4 further comprising an outer conduit coupling indicating device that can be closed only when said outer conduit coupling engages said first outer conduit sealing mechanism and said second outer conduit sealing mechanism.

9. A coupling assembly for fuel transfer comprising:
a first conduit coupling half and a second conduit coupling half, said first conduit coupling half connected to said second conduit coupling half at a first end to allow for opening and closing of the coupling assembly;
a latch system that secures said first conduit coupling half to said second conduit coupling half at a second end when the coupling assembly is in a closed position, wherein said latch system comprises:
a first latch pin located on said first conduit coupling half;
a first segment pivotally attached to said first latch pin;
a second latch pin located on said second coupling half so that said first latch segment can engage said second latch pin; and
a second latch segment and a third latch segment pivotally attached to said second latch pin so that they can engage said first latch pin; and
an indication device that closes into a locked position only when said latches secure said first conduit coupling half to said second conduit coupling half.

10. The coupling assembly as recited in claim 9 further comprising a first pivot supporting said first latch pin on said first conduit coupling half.

11. The coupling assembly as recited in claim 9 further comprising a second pivot supporting said second latch pin on said second conduit coupling half.

12. The coupling assembly as recited in claim 9 further comprising a first spring clip attached to said first conduit coupling half and applying a downward force on said first and second latches.

13. The coupling assembly as recited in claim 12 wherein said indicating device is in communication with said second spring clip which applies an upward force on said indicating device forcing said indicating device into an open state.

14. The coupling assembly as recited in claim 9 further comprising a second spring clip attached to said second conduit coupling half and applying a downward force on said third latch pin.

15. The coupling assembly as recited in claim 9 wherein said indicating device is attached to said second latch pin and can only engage said first pivot when said first and second latch segments engage said second latch pin and said third latch segment engages said first latch pin.

16. The coupling assembly recited in claim 9 wherein said indicating device comprises two detents to secure said indicating device.

* * * * *